(12) United States Patent
Hendrickx

(10) Patent No.: US 11,994,211 B2
(45) Date of Patent: May 28, 2024

(54) GROOVE FOLLOWER

(71) Applicant: Punch Powertrain N.V., Sint-Truiden (BE)

(72) Inventor: Koen Roger Emma Hendrickx, Sint-Truiden (BE)

(73) Assignee: PUNCH POWERTRAIN N.V., Poort Sint-Truiden (BE)

( * ) Notice: Subject to any disclaimer, the term of this patent is extended or adjusted under 35 U.S.C. 154(b) by 14 days.

(21) Appl. No.: 17/824,157

(22) Filed: May 25, 2022

(65) Prior Publication Data

US 2022/0381339 A1 Dec. 1, 2022

(30) Foreign Application Priority Data

May 25, 2021 (NL) ....................................... 2028287

(51) Int. Cl.
*F16H 63/18* (2006.01)
*F16H 63/30* (2006.01)

(52) U.S. Cl.
CPC ..... *F16H 63/18* (2013.01); *F16H 2063/3096* (2013.01)

(58) Field of Classification Search
CPC ............. F16H 63/18; F16H 2063/3096; F16H 2063/322
See application file for complete search history.

(56) References Cited

U.S. PATENT DOCUMENTS 7,631,576 B2 * 12/2009 Kapp ...................... F16H 63/18
74/569
2006/0283681 A1 12/2006 Kapp et al.

FOREIGN PATENT DOCUMENTS

| DE | 102014104569 A1 | 10/2015 |
| GB | 1165993 | 10/1969 |
| WO | 96/30675 A1 | 10/1996 |
| WO | 2016/172471 A1 | 10/2016 |

OTHER PUBLICATIONS

Search Report dated May 31, 2021, issued in corresponding Netherlands Patent Application No. 2028287 (8 pgs.).
European Search Report dated Oct. 12, 2022, issued in corresponding European Patent Application No. EP 22175082 (2 pgs.).

* cited by examiner

*Primary Examiner* — Victor L MacArthur
(74) *Attorney, Agent, or Firm* — Pillsbury Winthrop Shaw Pittman, LLP

(57) ABSTRACT

A groove follower is provided for cooperating with a shift groove of a shift drum of a multi-step sequential transmission for a motor vehicle, comprising a groove follower body, comprising at least one contact surface for contacting a lateral face of the shift groove of the shift drum, wherein at least part of the at least one contact surface is formed as part of an outer surface of a three-dimensional helix with a helix diameter and a helix pitch.

14 Claims, 5 Drawing Sheets

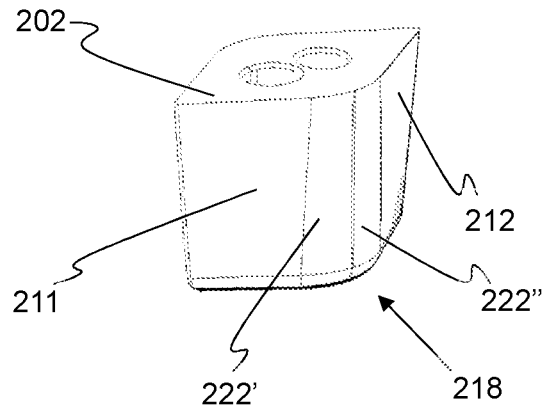
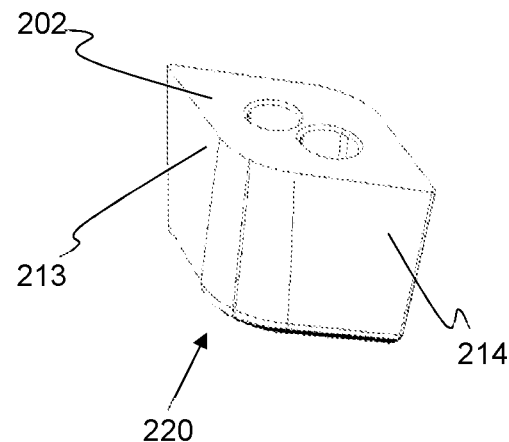
FIG 2A  FIG 2B
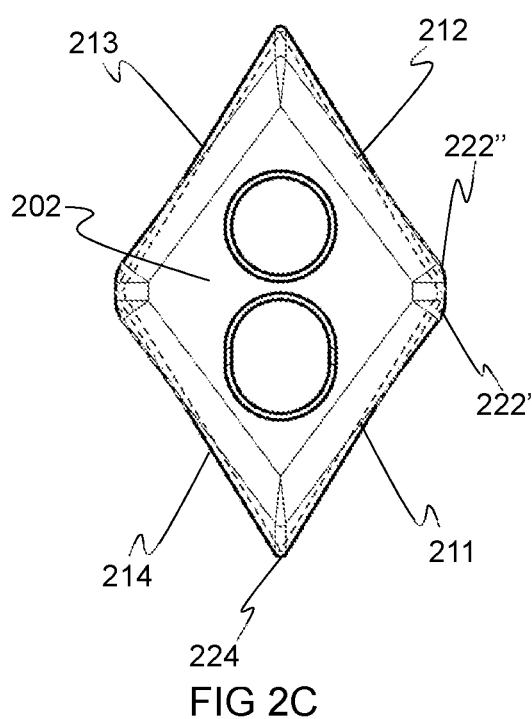
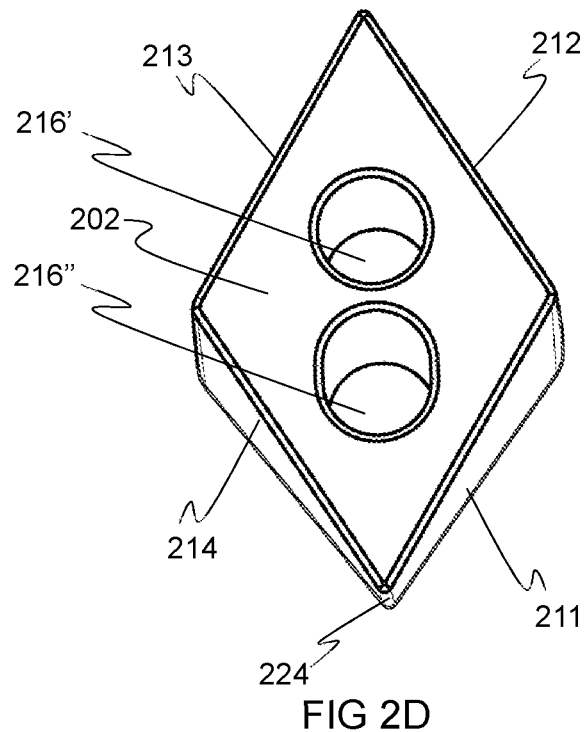
FIG 2C  FIG 2D

GROOVE FOLLOWER

CROSS-REFERENCE TO RELATED APPLICATION(S)

The subject application claims priority to Netherlands Patent Application No. 2028287, filed May 25, 2021, the contents of which are incorporated herein by reference in their entirety.

TECHNICAL FIELD

The aspect and embodiments thereof relate to the field of groove followers for shift drums.

BACKGROUND

Groove followers, in particular sliding blocks, rolls or similar groove followers are generally known in the prior art. Groove followers are used in corporation with a shift drum, which comprises one or more grooves at an outer surface. When the shift drum is rotated around an axial axis of rotation, by virtue of a particular shape of the groove, the groove follower may be translated axially relative to the shift drum.

US20060283681A1 discloses a groove follower for cooperating with a shift groove of a shift drum of a multi-step transmission for a motor vehicle, the groove follower having a vertical crowning and a longitudinal crowning, wherein the entirety of all vertices of the vertices of the vertical crowning forms a guide curve along the circumference of the groove follower, wherein a position of the vertices of the vertical crowning is selected such that the guide curve corresponds essentially to the active diameter of the shift drum.

SUMMARY

It is preferred to provide a groove follower which is less complex to machine or manufacture, more durable, allows for use of cheaper manufacturing and/or materials, and/or allows for softer material to be used for a shift drum.

A first aspect provides a groove follower, in particular for cooperating with a shift groove of a shift drum of a multi-step sequential transmission for a motor vehicle, comprising a groove follower body, comprising at least one contact surface for contacting a lateral face of the shift groove of the shift drum, wherein at least part of the at least one contact surface is formed as part of an outer surface of a three-dimensional helix with a helix diameter and a helix pitch.

The motor vehicle may for example be a car, bus, motorcycle, moped, or any other vehicle comprising an electric motor and/or internal combustion engine.

For defining a three-dimensional helix, a helix curve may be used. A helix curve may in particular be a cylindrical helix curve, and may be described by a diameter and a pitch, and for example a number of turns or part of a single turn. The diameter and/or the pitch may be constant or may be non-constant.

A parametric model may be used to describe a helix. In particular, the pitch of the helix may be described based on an active diameter of the shifting concept and a shift angle to be used as:

$$\text{Pitch} = \tan(\text{Angle}_{shift}) * \pi * D_{active}$$

When a two-dimensional shape, for example a square or a rectangle, is swept around the helix curve, a three-dimensional helix may be obtained. This three-dimensional helix has four curved surfaces, a beginning surface perpendicular to the curved surfaces and an end surface parallel to the beginning surface. A three-dimensional helix may for example resemble the shape of a coil spring when a circle is swept around the helix curve.

In use, the contact surface may interface with the shift drum, in particular with a surface of the shift groove. The contact surface may be pressed against or into the shift groove, also when the contact surface is moved relative to the shift groove. It may be preferred to prevent or reduce the occurrence of point contacts or line contacts between the groove follower and the shift groove, for example to reduce wear.

The groove follower body may generally resemble a rectangle, parallelepiped, prism, or any other prismatoid.

As options, the groove follower body may comprise two, four or more than four contact surfaces for contacting the shift groove of the shift drum, and at least part of two, more, or each of the contact surfaces may be formed as part of the outer surface of the three-dimensional helix.

Two contact surfaces may be generally positioned on a first side of the groove follower body, and two contact surfaces may be generally positioned on a second side of the groove follower body. The first side and the second side may be generally curved sides, and may be positioned on opposite sides of the groove follower body.

Two adjacent contact surfaces may be joined by a curved or crowned surface. As such, a sharp edge between adjacent contact surfaces may be avoided.

A second aspect provides a shift drum, in particular for a multi-step sequential transmission for a motor vehicle, comprising a shift drum body with an outer surface, a shift groove in the outer surface of the shift drum body, wherein at least part of the shift groove is generally shaped as an outer surface of a three-dimensional helix with a helix diameter and a helix pitch.

A shift groove may be generally defined by two lateral faces or lateral faces which are joined by a bottom face, and wherein the lateral faces or lateral faces generally face each other. A cross-sectional shape of a shift groove may be generally square or rectangular, or generally similar to a trapezoid or a parallelogram.

At least one or both of the lateral faces may be joined with the outer surface by a curved surface or a generally straight edge. The cross-sectional shape of the shift groove may be tapered in a direction away from the outer surface of the shift drum. As such, deformation of a groove follower may be allowed in the groove.

A third aspect provides a multi-step sequential transmission for a motor vehicle, comprising a shift drum, in particular according to the second aspect, and a groove follower, in particular according to the first aspect. The groove follower may be positioned at least partially in the shift groove of the shift drum.

As an option, part of the outer surface of the groove follower has a shape corresponding to the shape of part of the shift groove of the shift drum. As such, when these two parts interface, a contact surface may be obtained instead of a line or point contact.

The helix diameter and the helix pitch of the three-dimensional helix after which part of the outer surface of the groove follower is formed may correspond to, generally match or even match the helix diameter and the helix pitch according to which part of the shift groove is generally shaped. To correspond to may imply that the helix diameters and/or helix pitches are equal or approximately equal, for example only differing 5% or less, 10% or less, or 15% or less.

Part of the groove follower body may generally have the same shape as part of the shift groove. In other words, part of the groove follower body may generally be a negative of part of the shift groove.

A fourth aspect provides a method of manufacturing a shift drum, comprising providing a shift drum body, and, using a milling machine with a rotating milling tool, milling at least one groove into the shift drum body, wherein during at least part of the milling, the shift drum body is simultaneously rotated around a rotation axis and translated over said rotation axis relative to milling tool to form a shift slope. In particular, at least part of the rotation and translation may be at a constant rotational speed and translational speed.

By virtue of the method according to the fourth aspect, a shift drum may be obtained with a shift groove in the outer surface of the shift drum body, wherein at least part of the shift groove is generally shaped as an outer surface of a three-dimensional helix with a helix diameter and a helix pitch.

A fifth aspect provides a method of manufacturing a groove follower, comprising providing a groove follower body, and, using a milling machine with a rotating milling tool, milling a contact surface on the groove follower body, wherein during at least part of the milling, the groove follower body is simultaneously rotated around a rotation axis and translated over said rotation axis relative to milling tool to form the contact surface.

By virtue of the method according to the fifth aspect, a groove follower may be obtained with at least part of at least one contact surface formed as part of an outer surface of a three-dimensional helix with a helix diameter and a helix pitch.

The helix pitch may be determined by a ratio between the rotation and the translation over the rotation axis relative to the milling tool.

In order to determine an outer shape of a body such as a groove follower or a shift drum, different techniques may be used. In an example, the outer shape may be determined by examining the production process used to make the body. The production process may for example comprise any one of milling, additive manufacturing, injection moulding, any other manufacturing process or any combination thereof. The production process may be based on a CAD model, prescribing the outer shape of the body.

After the production process has been finished, the outer shape of the body may for example be determined using laser scanning or a touch probe.

BRIEF DESCRIPTION OF THE FIGURES

FIGS. 2A-2D depict embodiments of groove followers, respectively in a front perspective view, a rear perspective view, a top view, and a slightly tilted top view;

DETAILED DESCRIPTION OF THE FIGURES

Figure 1A:
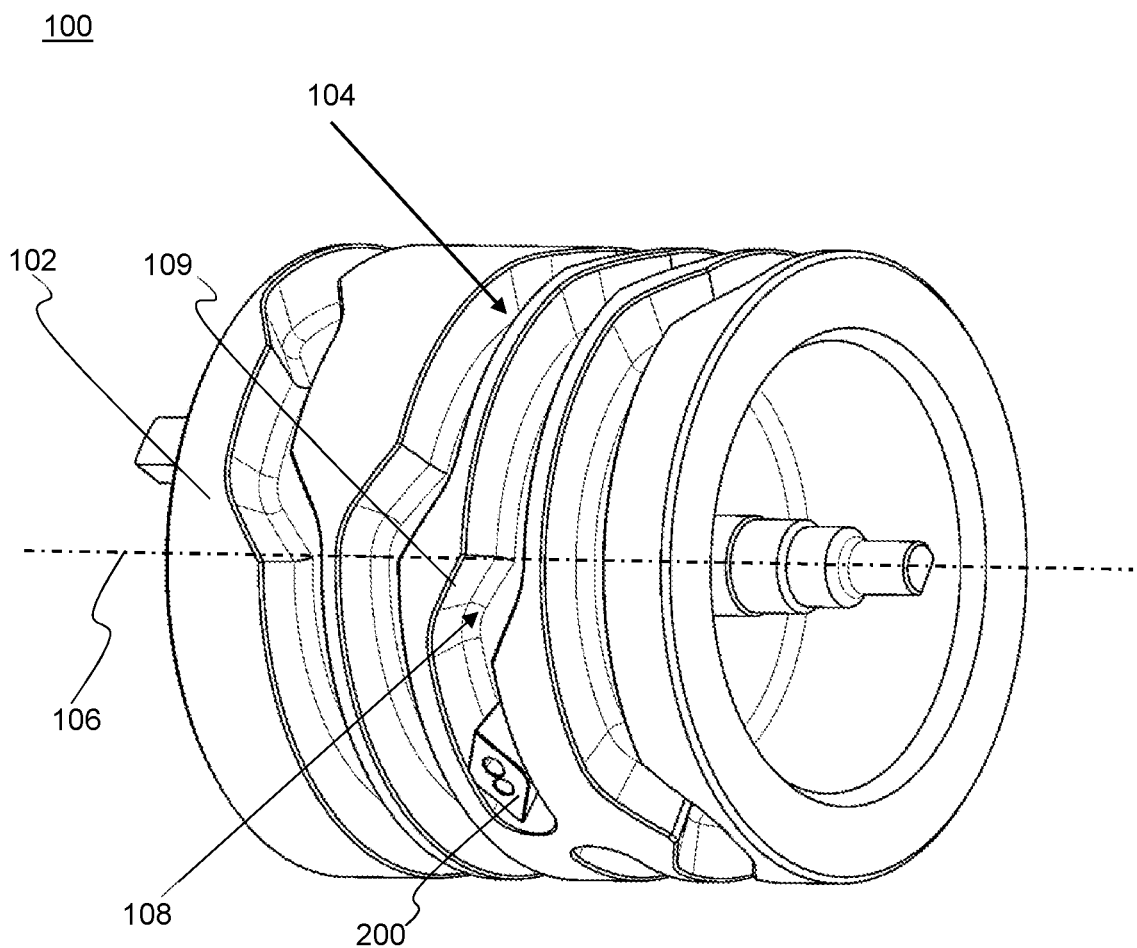
FIG. 1A shows an overview of part of a multi-step sequential transmission for a motor vehicle.

FIG. 1A shows in a perspective view an overview of part of a multi-step sequential transmission 100 for a motor vehicle, comprising a shift drum 102 and a groove follower 200 positioned in a groove 104 of the shift drum 102. The shift drum 102 can be rotated around an axis of rotation 106.

When the shift drum 102 is rotated around the axis of rotation 106, the shift drum 102 is moved relative to the groove follower 200. By virtue of the shape of the groove 104, the groove follower 200 may be moved axially when the shift drum 102 is rotated. An axial movement of the groove follower 200 may be approximately parallel to the axis of rotation 106. During axial movement of the groove follower 200, a contact surface of the groove follower 200 engages a shift slope 108, in particular a lateral face 109 of the shift slope 108. In particular, the groove follower 200 slides against the lateral face 109 of the shift slope 108.

A shift drum may comprise any number of grooves, for example four as shown in FIG. 1A. A groove may comprise any number of stepped grooved sections, such as multiple stepped grooved sections, with multiple lateral faces against which a groove follower may slide.

Figure 1B:
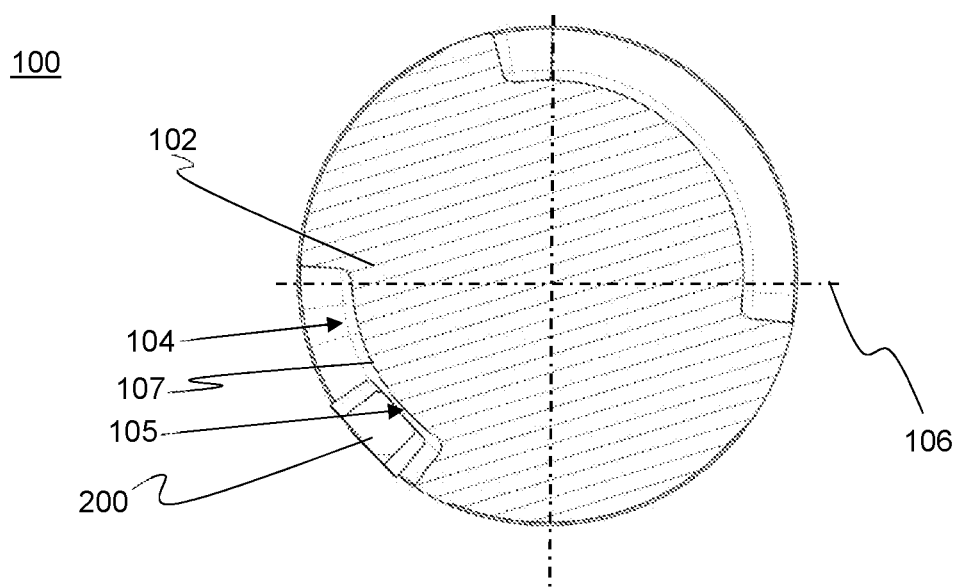
FIG. 1B shows a section view of FIG. 1A.

FIG. 1B shows the shift drum 102 and groove follower 200 of FIG. 1A in a section view in a plane perpendicular to the axis of rotation 106. As can be seen in FIG. 1B, the groove follower 200 is at least partially positioned inside the groove 104. A gap 105 may be present between the groove follower 200 and a bottom face 107 of the shift drum 102.

FIGS. 2A-2D depict embodiments of a groove follower 200, respectively in a front perspective view, a rear perspective view, a top view, and a slightly tilted top view. The groove follower 200 comprises the groove follower body 202, which comprises four contact surfaces: a first contact surface 211, a second contact surface 212, a third contact surface 213, and a fourth contact surface 214.

The first contact surface 211 and the second contact surface 212 are generally positioned on a first side 218 of the groove follower body, and the third contact surface 213 and the fourth contact surface 214 are generally positioned on a second side 220 of the groove follower body 202.

As for example shown in FIG. 2A, two adjacent contact surfaces may be joined by one or more curved surfaces. In particular, the first contact surface 211 is adjacent to the second contact surface 212, and the first and second contact surface are joined by two curved surfaces 222' and 222". An edge between the two curved surfaces 222' and 222" may be rounded off.

As for example shown in FIG. 2C, the first contact surface 211 and the fourth contact surface 214 are joined by a curved surface 224 or radius. Similarly, the second contact surface 212 and the third contact surface 213 are joined by a curved surface or radius.

Figure 3A:
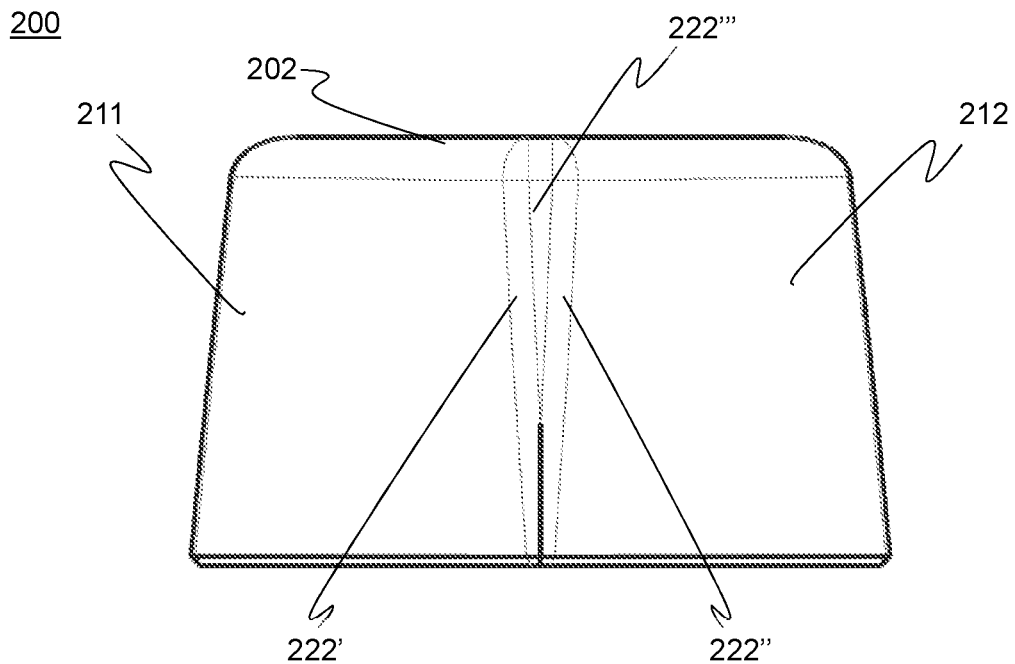
FIGS. 3A and 3B show another example of a groove follower
Figure 3B:
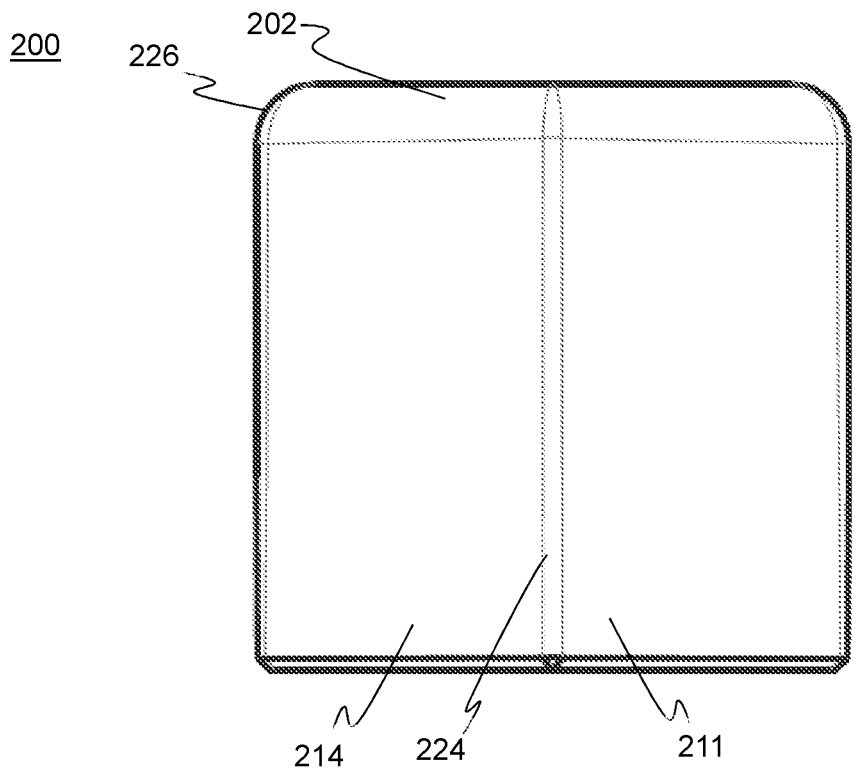

FIGS. 3A and 3B show another example of a groove follower 200, respectively in a side view showing the first contact surface 211 and the second contact surface 212, and a front view showing the first contact surface 211 and the fourth contact surface 214.

As can be seen in FIG. 3A, as an option applicable to any embodiment of the groove follower, one or more or all of the curved surfaces joining contact surfaces may be tapered. For example, FIG. 3A shows tapered curved surfaces 222', 222", 222'" joining the first contact surface 211 and the second contact surface 212. The tapered shape of a curved surface may be the result of at least part of at least one contact surface being formed as part of an outer surface of a three-dimensional helix.

As shown in FIG. 3B, as an option applicable to any embodiment of the groove follower, a top section 226 of the groove follower body 202 may be joined with one or more of the contact surfaces via a curved top section 226.

In general, curved sections may be used to allow or improve movement of the groove follower body through a groove of a shift drum, and/or to prevent or reduce line contacts or point contacts between the shift drum and the groove follower.

Through the groove follower body 202, two optional through-holes 216 are provided, which may be approximately parallel to one or more of the contact surfaces. The through-holes 216 may be used for connecting one or more connection rods to the groove follower 200. A through-hole may for example have a circular, approximately oval or stadium shape. A stadium or racetrack shape will be understood as being constructed of a rectangle with semicircles at a pair of opposite sides.

Figure 4A:
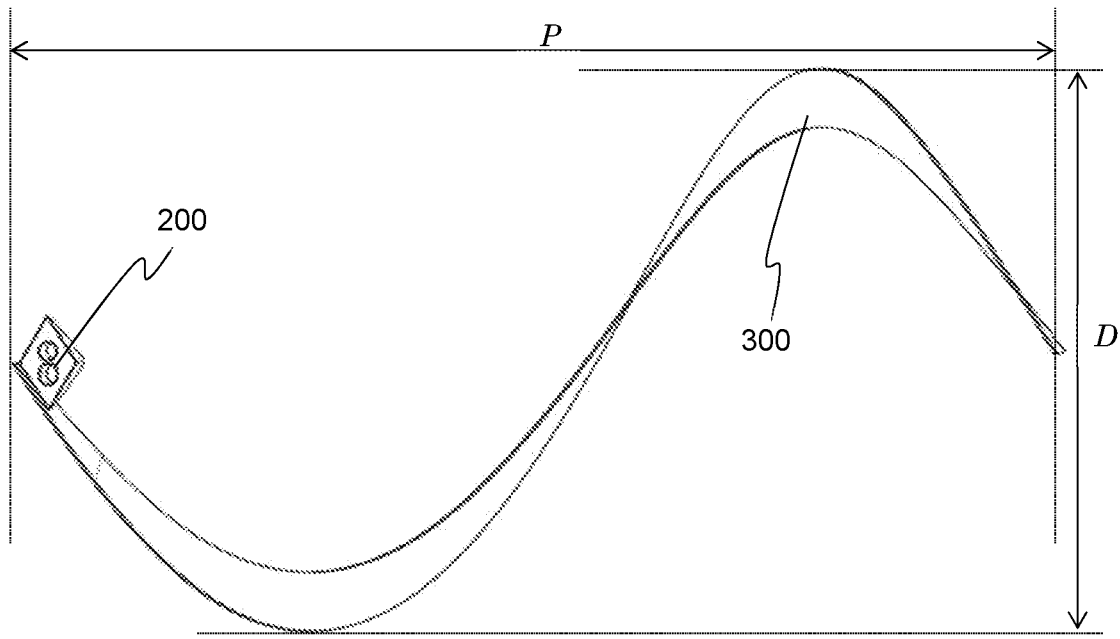
FIGS. 4A and 4B respectively depict an embodiment of the groove follower and an imaginary three-dimensional helix.
Figure 4B:
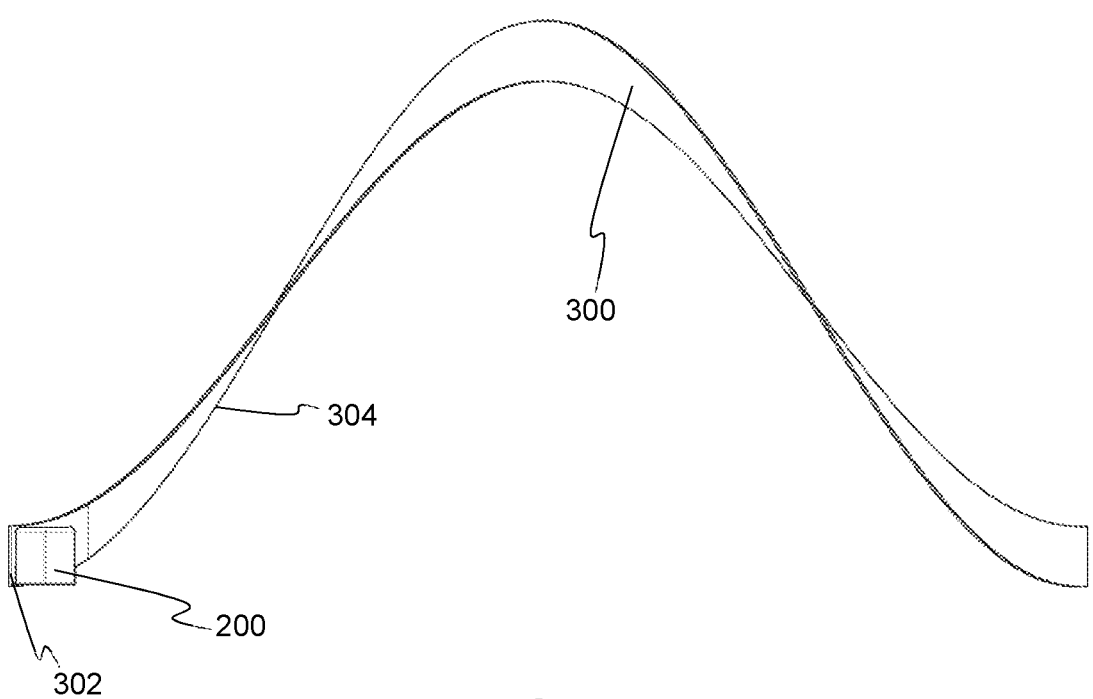

FIGS. 4A and 4B respectively depict an embodiment of the groove follower 200 and an imaginary three-dimensional helix 300 to further visualise the shape of at least part of at least one contact surface of the groove follower. The three-dimensional helix is formed by sweeping a rectangle 302 around a helix curve 304. In FIG. 3A, generally the diameter D and the pitch P of the helix curve are indicated.

The three-dimensional helix 300 depicted in FIGS. 3A and 3B is used to define the shape of one of the four contact surfaces. Three other three-dimensional helixes may be used to define the shape of at least part of the other three contact surfaces. For clarity of FIGS. 3A and 3B, these other three three-dimensional helixes have been omitted.

Figure 5A:
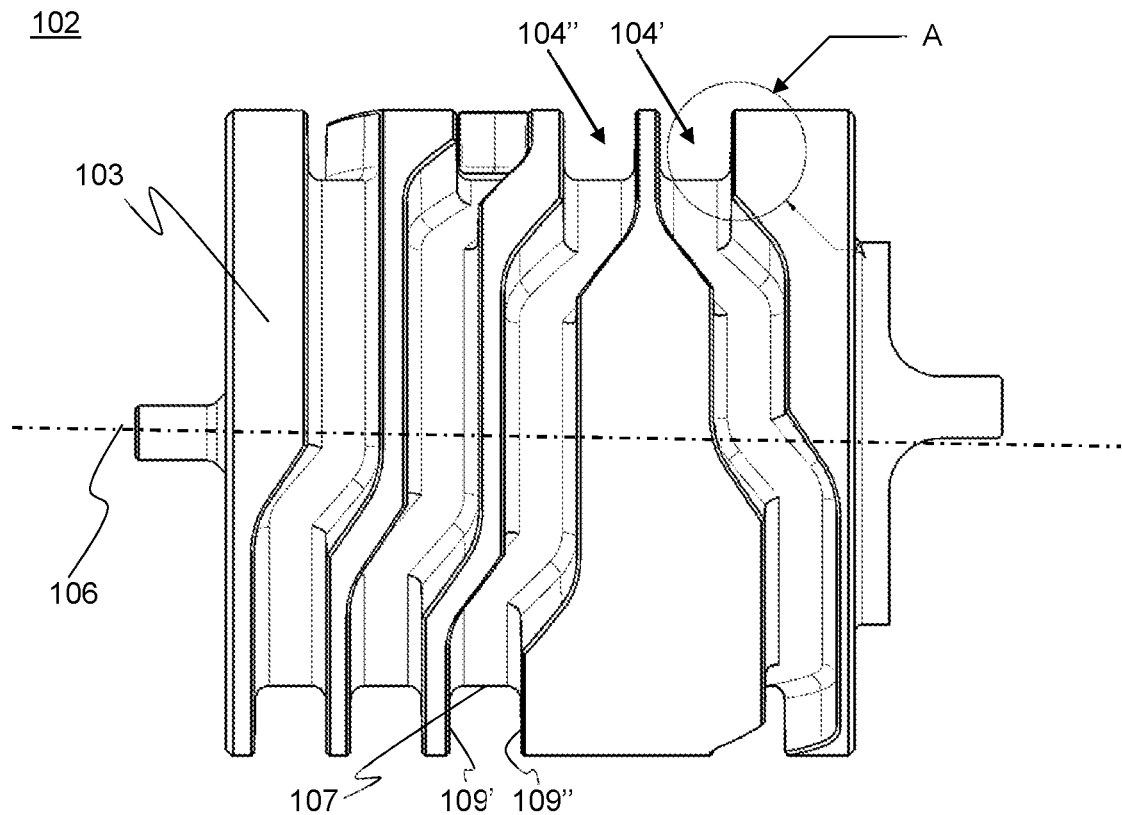
FIG. 5A depicts an example of a shift drum in a side view.
Figure 5B:
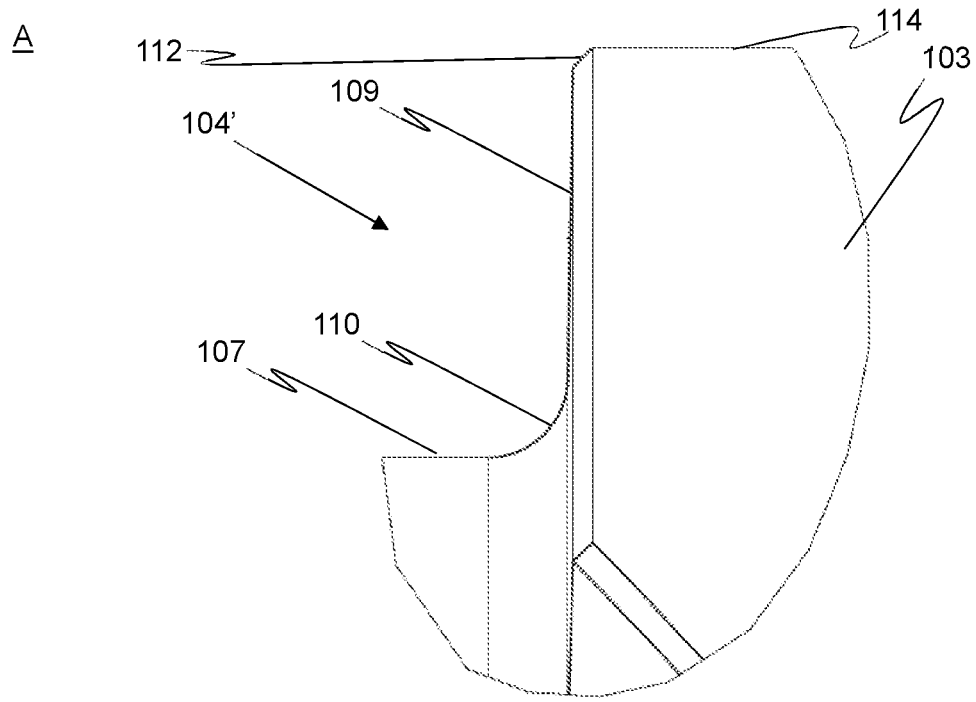
FIG. 5B depicts detail A of FIG. 5A.

FIG. 5A depicts an example of a shift drum 102 in a side view. FIG. 5B shows detail A as indicated in FIG. 5A. As shown for example in FIG. 5A, groove 104" is formed by two lateral faces 109' and 109", which face each other and are joined by bottom face 107.

The detailed side view of FIG. 5B shows in more detail how a lateral face 109 may be adjoined by the bottom face 107. As an option, a curved surface 110 may be present joining the lateral face 109 and the bottom face 107.

As a further option, at least part of a lateral face 109 may be curved or crowned. A crowned surface or crowned face has a slight curvature, in particular a slight convex curvature.

A top section 112 of the lateral face 109 may be joined with an outer surface 114 of the shift drum body 103 with a curved, rounded, or bevelled edge. As such, in the side view of FIG. 5B, at least part of the groove 104' is tapered or slightly tapered away from the outer surface 114.

In the description above, it will be understood that when an element is referred to as being connect to another element, the element is either directly connected to the other element, or intervening elements may also be present. Also, it will be understood that the values given in the description above, are given by way of example and that other values may be possible and/or may be strived for.

It is to be noted that the figures are only schematic representations of embodiments that are given by way of non-limiting examples. For the purpose of clarity and a concise description, features are described herein as part of the same or separate embodiments, however, it will be appreciated that the scope of the disclosure may include embodiments having combinations of all or some of the features described.

The word 'comprising' does not exclude the presence of other features or steps. Furthermore, the words 'a' and 'an' shall not be construed as limited to 'only one', but instead are used to mean 'at least one', and do not exclude a plurality.

The invention claimed is:

1. A groove follower for cooperating with a shift groove of a shift drum of a multi-step sequential transmission for a motor vehicle, the groove follower comprising:
    a groove follower body, comprising at least one contact surface for contacting a lateral face of the shift groove of the shift drum,
    wherein at least part of the at least one contact surface is formed as part of an outer surface of a three-dimensional helix with a helix diameter and a helix pitch.

2. The groove follower according to claim 1, wherein the groove follower body comprises four contact surfaces for contacting the shift groove of the shift drum, and wherein at least part of each of the four contact surfaces is formed as part of the outer surface of the three-dimensional helix.

3. The groove follower according to claim 2, wherein two contact surfaces are generally positioned on a first side of the groove follower body, and two contact surfaces are generally positioned on a second side of the groove follower body.

4. The groove follower according to claim 3, wherein a first contact surface positioned on the first side of the groove follower body is joined by a curved surface with a fourth contact surface positioned on the second side of the groove follower body.

5. The groove follower according to claim 2, wherein two adjacent contact surfaces are joined by one or more curved surfaces.

6. The groove follower according to claim 5, wherein the two adjacent contact surfaces comprise a first contact surface and a second contact surface that are joined by two or more curved surfaces.

7. A multi-step sequential transmission for a motor vehicle, the transmission comprising:
    a groove follower according to claim 1;
    a shift drum comprising a shift drum body with an outer surface and a shift groove in the outer surface of the shift drum body, at least part of the shift groove being generally shaped as an outer surface of a three-dimensional helix with a helix diameter and a helix pitch;
    wherein the groove follower is positioned at least partially in the shift groove of the shift drum.

8. The transmission according to claim 7, wherein part of the outer surface of the groove follower has a shape corresponding to a shape of part of the shift groove of the shift drum.

9. The transmission according to claim 7, wherein the helix diameter and the helix pitch of the three-dimensional helix after which part of the outer surface of the groove follower is generally formed correspond to the helix diameter and the helix pitch according to which part of the shift groove is generally shaped.

10. The transmission according to claim 7, wherein the shift groove of the shift drum is generally defined by two lateral faces which are joined by a bottom face, and wherein the lateral faces generally face each other.

11. The transmission according to claim 10, wherein at least one of the lateral faces is joined with the outer surface by a curved surface.

12. The transmission according to claim 11, wherein at least part of at least one of the two lateral faces of the shift drum is crowned.

13. The transmission according to claim 10, wherein at least part of at least one of the two lateral faces of the shift drum is crowned.

14. A method of manufacturing the groove follower according to claim 1, the method comprising:
   providing the groove follower body; and
   using a milling machine with a rotating milling tool, milling the at least one contact surface on the groove follower body, wherein during at least part of the milling, the groove follower body is simultaneously rotated around a rotation axis and translated over said rotation axis relative to milling tool to form the at least one contact surface.

\* \* \* \* \*